United States Patent [19]

Mehrgardt

[11] Patent Number: 4,803,407
[45] Date of Patent: Feb. 7, 1989

[54] DIGITAL HORIZONTAL-DEFLECTION CIRCUIT

[75] Inventor: Soenke Mehrgardt, March, Fed. Rep. of Germany

[73] Assignee: Deutsche ITT Industries GmbH, Freiburg, Fed. Rep. of Germany

[21] Appl. No.: 74,203

[22] Filed: Jul. 16, 1987

[30] Foreign Application Priority Data

Jul. 31, 1986 [EP]  European Pat. Off. ........ 86110576.5

[51] Int. Cl.$^4$ .......................... H01J 29/70; H01J 29/72
[52] U.S. Cl. ...................................... 315/364; 358/158
[58] Field of Search .................. 315/364, 367, 399; 358/158, 195.1

[56] References Cited

U.S. PATENT DOCUMENTS

4,636,861  1/1987  Willis .................................. 358/158

FOREIGN PATENT DOCUMENTS

1370074  10/1974  United Kingdom .

OTHER PUBLICATIONS

ITT Intermetall Data Book, *Digit 2000 VLSI Digital TV System*, May 1985, pp. 112–114.

Patent Abstracts of Japan, vol. 7, No. 222 (E-201) (1367) Oct. 3, 1983, Fujitsu K.K.
Datenbuch Der Firma Intermetall—Digit 2000, VLSI Digital TV System, May 1984, pp. 112–113.

*Primary Examiner*—Theodore M. Blum
*Attorney, Agent, or Firm*—Thomas L. Peterson

[57] ABSTRACT

Instead of fine-controlling the horizontal deflection signal in a digital television receiver by means of two phase-locked loops and gate-delay stages as is done in prior art arrangements, in the horizontal-deflection circuit according to the invention, a first digital word delivered by a first phase-locked loop and representative of the horizontal frequency is added in an adder to a suitably amplified third digital word delivered by a phase comparator of a second phase-locked loop. The output of the adder is fed to the control input of a digital sine-wave generator which drives a frequency divider. The latter delivers the horizontal deflection signal, which drives the horizontal output stage. The phase comparator is fed with the horizontal flyback signal, which is derived from the horizontal deflection signal, and a second digital word generated by the first phase-locked loop and representative of the desired phase position of the flyback signal.

4 Claims, 1 Drawing Sheet

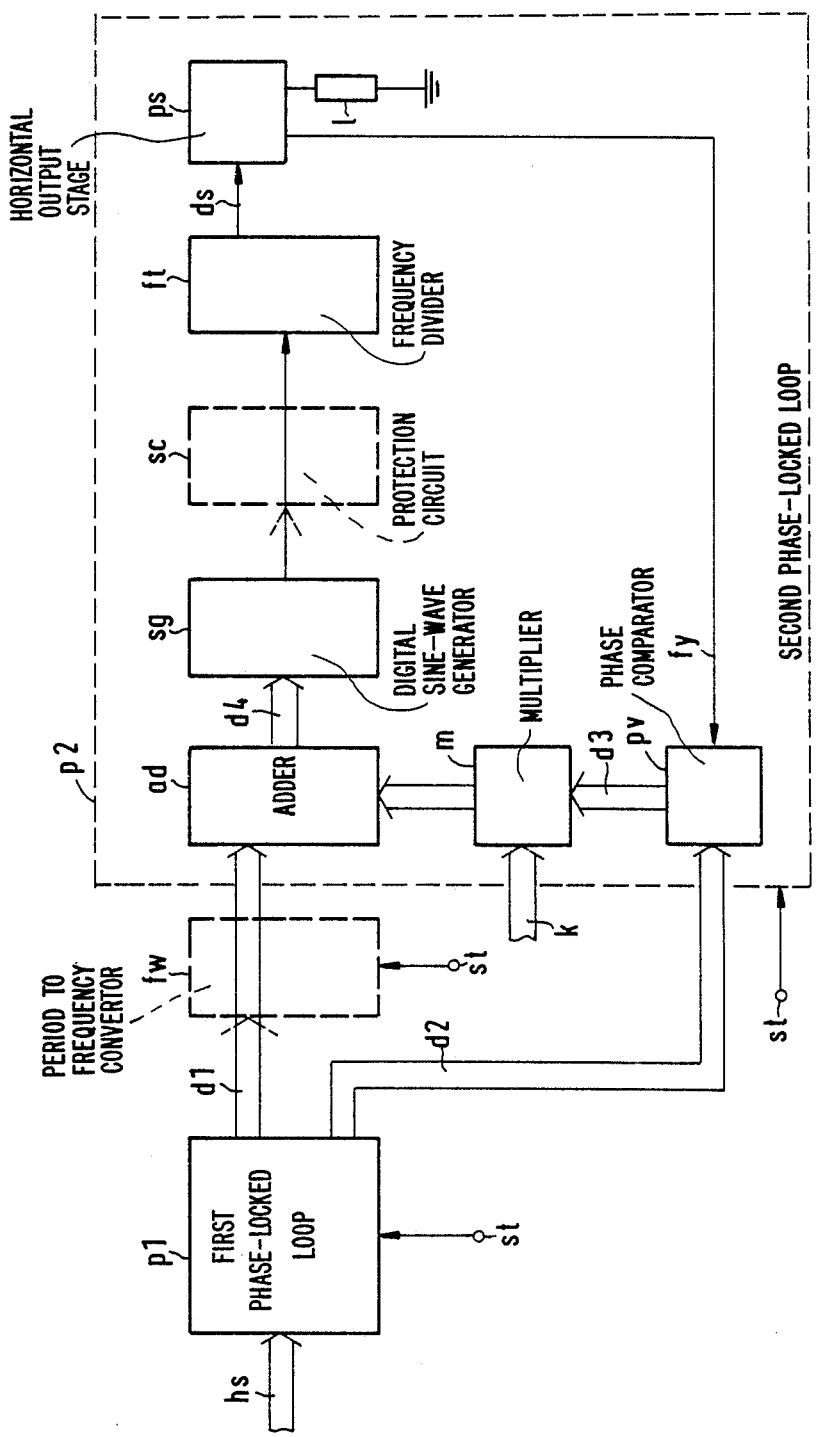

DIGITAL HORIZONTAL-DEFLECTION CIRCUIT

BACKGROUND OF THE INVENTION

The present invention relates to a digital horizontal-deflection circuit for generating an analog horizontal deflection signal driving the horizontal output stage of a digital television receiver clocked with a system clock. A digital horizontal-deflection circuit of this kind is described in a data book of Intermetall, "DIGIT 2000 VLSI Digital TV System," 1984/5, pages 112 to 114, which deal with the integrated circuit DPU 2500.

In the prior art arrangement, the phase variation which is necessary for the digital generation of the horizontal deflection signal and must be stepped in fractions of the period of the system clock is achieved essentially by the use of gate-delay stages or chains as are described, for example, in the European Patent Applications EP-A Nos. 0,059,802; 0,080,970; and 0,116,669, which essentially utilize the inherent delay of inverters. It turned out, however, that with these arrangements, it is not possible to completely control all operating conditions which may occur.

SUMMARY OF THE INVENTION

It is, therefore, the object of the invention to modify and improve the digital horizontal-deflection circuit described in the above prior art in such a way that the gate-delay stages can be dispensed with.

DETAILED DESCRIPTION OF A PREFERRED EMBODIMENT

The invention will now be explained in more detail with reference to the single FIGURE of the accompanying drawing, which is a block diagram of an embodiment of the invention. The block diagram shows that portion of a digital television receiver, i.e., of a television receiver in which the analog signal received via the antenna is processed digitally, which is of interest in connection with the invention. Thus, all subcircuits for digital-to-analog conversion, sync separation, chrominance-signal and luminance-signal processing or sound-signal processing have been omitted; the overall circuit concept of digital television receivers has been well known for some time.

The first digital phase-locked loop (PLL) p1 is supplied with the (digital) horizontal synchronizing signal hs, which was separated from the composite color signal, and the system clock st, and derives therefrom, in the manner described in the prior art, the first digital word d1, which is representative of the horizontal frequency, and the second digital word d2, which is representative of the desired phase position of the horizontal flyback signal fy. The signal fy comes from the receiver's horizontal output stage ps, which supplies the necessary sawtooth current to the deflection coil 1. The phase position of the flyback signal fy relative to the horizontal deflection signal ps is dependent on the switching properties of the horizontal output stage ps and is also influenced by the video signal applied to the picture tube.

By means of the second PLL p2, indicated in the FIGURE by the large rectangle bounded by a broken line, these dependences are compensated in the manner described in the prior art. The phase comparator pv generates the third digital word d3, which is representative of the phase deviation of the flyback signal fy from its desired position, and the second PLL p2 shifts the horizontal deflection signal ds in time so that the flyback signal fy takes up the desired phase position.

The first digital word d1 is fed to the first input of the adder ad, and the third digital word d3 is fed to the second input of this adder via the multiplier m, which serves as an amplifier. The second input of the multiplier m is fed with the signal k determining the gain of the second PLL p2, so that the transient response of the latter can be optimally adjusted by the manufacturer of the television receiver.

The output of the adder ad is fed to the control input of the digital sine-wave generator s, which may be designed as an accumulator followed by a sine looker table (ROM). If an n-bit word d4 is applied to its control input, this arrangement, which is known in principle, delivers a sine-wave of frequency $(d4)fs/2^n$, where fs is the frequency of the system clock st.

The output of the digital sine-wave generator sg is fed to the frequency divider ft, which provides the horizontal deflection signal ds, a square-wave signal as usual. The frequency divider ft thus not only divides the frequency of the signal delivered by the sine-wave generator sg, but also converts the sine-wave signal into the above-mentioned square-wave signal; this can be done in a suitable sine-to-square wave converter stage at the input of the frequency divider ft.

Two stages which can be added to the arrangement singly or in combination are indicated in the FIGURE by rectangles bounded by broken lines. The period-to-frequency converter fw between the output of the first PLL pl for the first digital word d1 and the corresponding input of the adder ad is necessary if the first digital word d1, generated by the first PLL p1, represents the period of the horizontal deflection signal ds (if this word represents the frequency of the horizontal deflection signal, the stage fw is not necessary).

Between the output of the digital sine-wave generator sg and the input of the frequency divider ft, the protection circuit sc may be inserted. It is preferably an analog phase-locked loop which provides a sine-wave signal of the desired frequency if the frequency of the sine-wave generator sg departs from a predetermined desired-value range. This may be to advantage during the start-up phase after the turning on of the television receiver or may serve to afford protection in the event of a failure of one or both of the PLL's p1, p2.

In the FIGURE, the stripe-like connecting leads represent signal paths over which digital signals are transferred in parallel, i.e., on these buses, the individual (parallel) digital words follow one after the other at the pulse repetition rate of the system clock st. The fact that the individual stages of the second PLL p2—where necessary and appropriate—and the period-to-frequency converter fw are clocked with the system clock st, too, is indicated by the respective clock input lines.

The digital horizontal-deflection circuit in accordance with the invention is preferably realized using monolithic integrated circuit techniques, particularly MOS technology. It may form part of a larger integrated circuit but can also be implemented as a separate integrated circuit.

What is claimed is:

1. A digital horizontal-deflection circuit for generating an analog horizontal deflection signal driving the horizontal output stage of a digital television receiver clocked with a system clock, comprising:

a first digital phase-locked loop which synchronizes the horizontal deflection signal with the horizontal synchronizing signal separated from the composite color signal and delivers for each line of video signal a first digital word representative of the horizontal frequency and a second digital word representative of the desired phase position of the horizontal flyback signal;

a second phase-locked loop which uses a digital phase comparator to generate a third digital word representative of the phase deviation of the horizontal flyback signal from the desired position and shifts the horizontal deflection signal in time so that the horizontal flyback signal takes up the desired phase position;

an adder having a first input to which said first digital word is fed and a second input to which said third digital word is fed via a multiplier serving as an amplifier;

a digital sine-wave generator having a control input to which the output of said adder is fed; and a frequency divider to which the output of said digital sine-wave generator is supplied, the output of said frequency divider providing the horizontal deflection signal.

2. A horizontal-deflection circuit as defined in claim wherein said first digital word is representative of the period of the horizontal deflection signal, and additionally comprising a digital period-to-frequency converter connected between said first phase-locked loop and said first input of said adder.

3. A horizontal-deflection circuit as defined in claims 1 or 2, additionally comprising a protection circuit coupled between the output of said digital sine-wave generator and the input of said frequency divider, said protection circuit providing a sine-wave signal of a desired frequency if the frequency of said sine-wave generator departs from a desired-value range.

4. A horizontal-deflection circuit as defined in claim 3, wherein said protection circuit is an analog phase-locked loop.

* * * * *